US010172114B2

(12) United States Patent
Uusitalo et al.

(10) Patent No.: US 10,172,114 B2
(45) Date of Patent: Jan. 1, 2019

(54) APPARATUS AND ASSOCIATED METHODS FOR DETERMINING AVAILABLE CHANNELS BASED ON PREDICTED MOVEMENT

(75) Inventors: Mikko A Uusitalo, Helsinki (FI); Pasi Rinne-Rahkola, Helsinki (FI); Timo Rantalainen, Helsinki (FI); Ari Ahtiainen, Tuusula (FI)

(73) Assignee: Nokia Technologies Oy, Espoo (FI)

( * ) Notice: Subject to any disclaimer, the term of this patent is extended or adjusted under 35 U.S.C. 154(b) by 1143 days.

(21) Appl. No.: 12/636,640

(22) Filed: Dec. 11, 2009

(65) Prior Publication Data

US 2011/0143761 A1    Jun. 16, 2011

(51) Int. Cl.
| | | |
|---|---|---|
| H04W 72/00 | (2009.01) | |
| H04W 72/02 | (2009.01) | |
| H04W 16/14 | (2009.01) | |
| H04W 64/00 | (2009.01) | |

(52) U.S. Cl.
CPC ............ *H04W 72/02* (2013.01); *H04W 16/14* (2013.01); *H04W 64/006* (2013.01)

(58) Field of Classification Search
CPC ..... H04W 8/245; H04W 8/183; H04W 36/30; H04W 72/04; H04W 84/18; H04W 80/04; H04W 84/12; H04L 2012/5607
USPC .......... 455/418, 432.1, 436–444, 450–452.2, 455/41.2, 41.3; 370/310.2, 328, 338, 370/331–334
See application file for complete search history.

(56) References Cited

U.S. PATENT DOCUMENTS

| | | | | |
|---|---|---|---|---|
| 5,265,263 | A | * | 11/1993 | Ramsdale et al. ............ 455/441 |
| 5,572,221 | A | * | 11/1996 | Marlevi et al. ............... 342/452 |
| 6,195,342 | B1 | * | 2/2001 | Rohani ......................... 370/331 |
| 6,385,454 | B1 | | 5/2002 | Bahl et al. |
| 6,711,408 | B1 | * | 3/2004 | Raith ............................ 455/440 |
| 6,834,192 | B1 | * | 12/2004 | Watanabe ............ H04W 36/00 370/331 |

(Continued)

FOREIGN PATENT DOCUMENTS

| | | |
|---|---|---|
| CN | 1335037 A | 2/2002 |
| CN | 101098276 A | 1/2008 |

(Continued)

OTHER PUBLICATIONS htt://www.faqs.org/patents/app/20090034508.

(Continued)

*Primary Examiner* — Stephen M D Agosta
(74) *Attorney, Agent, or Firm* — Banner & Witcoff, Ltd.

(57) ABSTRACT

This document describes an apparatus for providing an advance indication of channels available for use by a mobile device travelling along a geographic path. The path extends across two or more cells, with each cell defining a particular set of radio channels available for use by the mobile device in that cell. The apparatus is configured to receive predicted geographic path signalling associated with prediction of the geographic path to be taken by the mobile device. The apparatus is also configured to determine radio channels available for use by the mobile device along that path. The apparatus is also configured to provide, in advance, an indication of the radio channels available for use by the mobile device along the geographic path in each respective cell along the path.

19 Claims, 5 Drawing Sheets

(56) References Cited

U.S. PATENT DOCUMENTS

| | | |
|---|---|---|
| 2003/0235163 A1* | 12/2003 | Montz et al. ............. 370/331 |
| 2008/0004000 A1 | 1/2008 | Boss et al. |
| 2009/0088089 A1 | 4/2009 | Chandra et al. |
| 2009/0180359 A1 | 7/2009 | Walter |
| 2009/0298522 A1 | 12/2009 | Chaudhri et al. |
| 2010/0323694 A1 | 12/2010 | Altintas |

FOREIGN PATENT DOCUMENTS

| | | |
|---|---|---|
| CN | 101365242 A | 2/2009 |
| JP | 2005-236818 | 3/2007 |
| WO | WO 2009/018300 | 2/2009 |
| WO | 2009040713 A2 | 4/2009 |
| WO | WO 2009/104689 | 8/2009 |

OTHER PUBLICATIONS https://mentor.ieee.org/802.19/dcn/09/19-09-0049-00-tvws-geographic-electromagnetic-raditiondomain-control-system.pdf.
Zhao, Y., et al. "Applying Radio Environment Maps to Cognitive Wireless Regional Area Networks." Spectrum Access Networks, Apr. 2007.
Celebi H., et al. "Utilization of Location Information in Cognitive Wireless Networks." IEEE Wireless Communications, Aug. 2007.
International Search Report for PCT Application No. PCT/FI2010/050873 dated Feb. 25, 2011.
Mar. 12, 2015 (CN) Office Action—App. 201080063657.2.
Nov. 8, 2016 (EP) Extended Search Report—App. 10835542.1.
Oct. 13, 2017—(EP) Office Action—App 10835542.1.

* cited by examiner

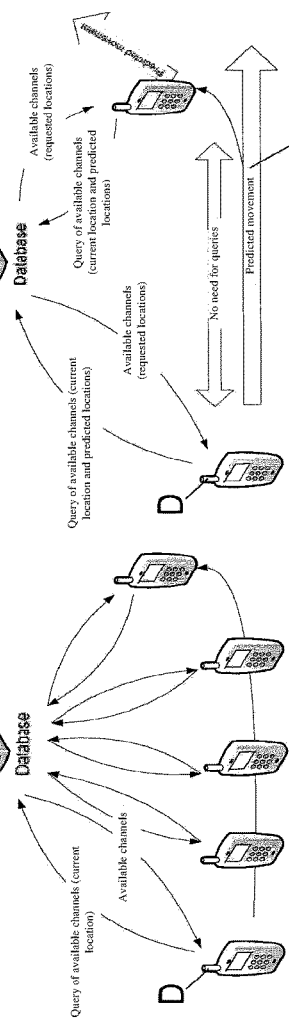
Fig. 4a Prior Art
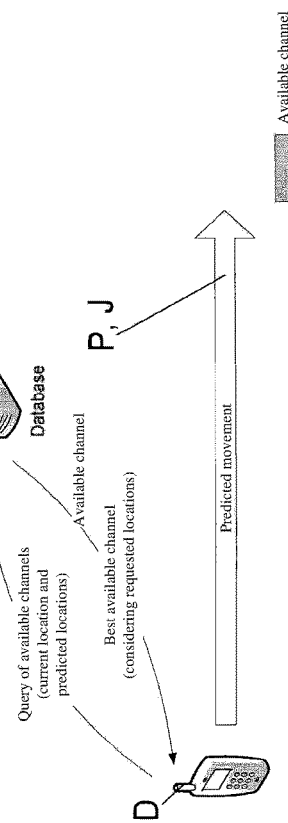
Fig. 4b Invention
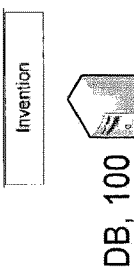
Fig. 5

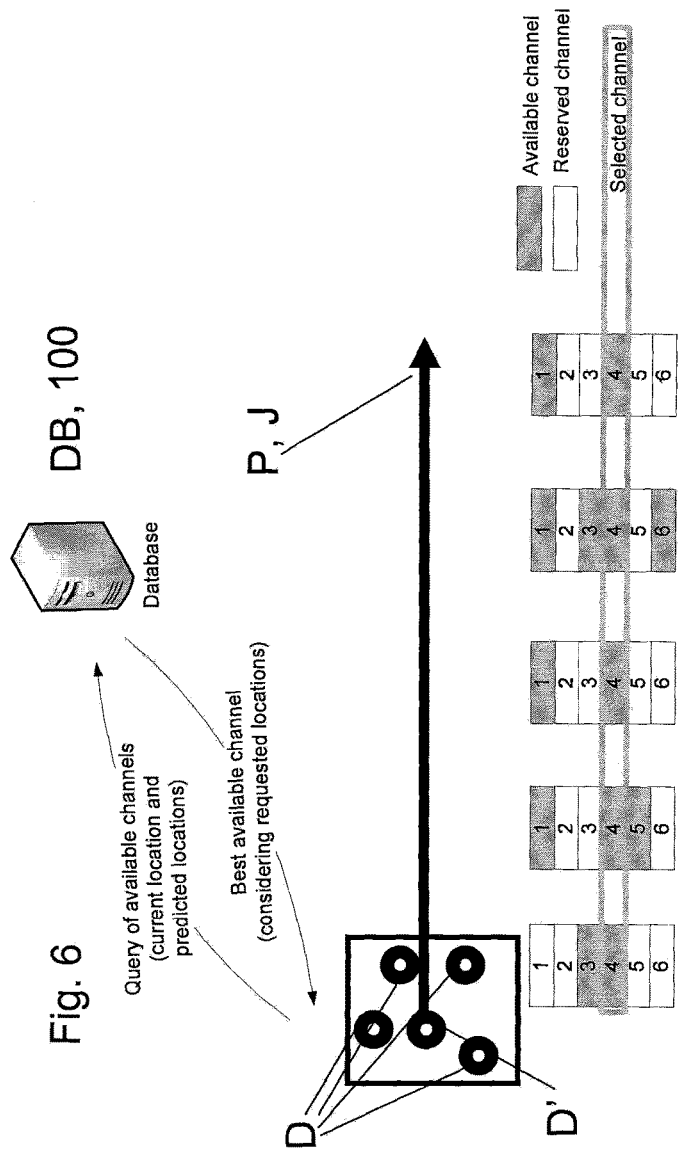
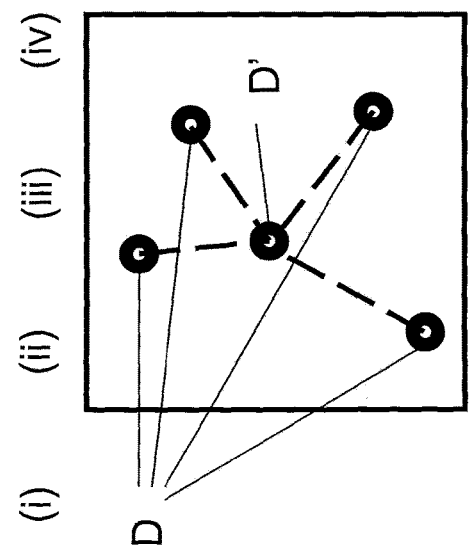
Fig. 6
Fig. 7

APPARATUS AND ASSOCIATED METHODS FOR DETERMINING AVAILABLE CHANNELS BASED ON PREDICTED MOVEMENT

The present disclosure relates to the field of unlicensed wireless communication, in particular, but not necessarily limited to, white-space devices (also known as WSDs), associated methods, computer programs and apparatus. Certain disclosed aspects/embodiments may relate to portable electronic devices, in particular, so-called hand-portable electronic devices which may be hand-held in use (although they may be placed in a cradle in use). Such hand-portable electronic devices include so-called Personal Digital Assistants (PDAs). In certain embodiments, such portable electronic devices may or may not be mobile cellular devices and/or white space devices.

The portable electronic devices/apparatus discussed in relation to, or according to one or more disclosed aspects/embodiments may provide one or more audio/text/video communication functions (e.g. tele-communication, video-communication, and/or text transmission (Short Message Service (SMS)/Multimedia Message Service (MMS)/emailing) functions), interactive/non-interactive viewing functions (e.g. web-browsing, navigation, TV/program viewing functions), music recording/playing functions (e.g. MP3 or other format and/or (FM/AM) radio broadcast recording/playing), downloading/sending of data functions, image capture function (e.g. using a (e.g. in-built) digital camera), and gaming functions.

BACKGROUND

Future wireless communication requires more efficient spectrum usage due to the increase of wireless communication traffic within a finite spectrum. Cognitive radio technologies present a possible way to alleviate this problem. These technologies help devices to collect information regarding available spectrum usage based on the nature of the device as well as the user environment, and to use that information to more efficiently share the spectrum with other devices.

For the purposes of wireless telecommunication, national and international bodies assign frequency bands (or channels) within the radio spectrum for specific uses, and in most cases, license the rights to these channels. Some specific parts of the spectrum may not be used by licensed services in a specific location at a specific time. Local regulatory authorities typically control and authorise the use of such "white-spaces" in their own respective regions, and the available "white-space" bandwidth will therefore vary from country to country.

In the case of the US, on the 4 Nov. 2008, the Federal Communications Commission (FCC) approved the use of vacant/unused portions of the broadcast spectrum in the 54 MHz-698 MHz range by unlicensed devices for fixed and personal/portable use. These vacant/unused portions of the spectrum are known as "white spaces". These became available for "unlicensed secondary use" after the switchover to digital TV broadcast. The FCC has also defined numerous safeguards in order to protect services and service providers against harmful interference of white spaces devices.

Firstly, all unlicensed white-space devices must include geographical location technology that allows the device to determine its location and to match the current location of the device against a pre-existing database of available channels corresponding to that geographical area.

FIG. 1 illustrates a channel availability database as presently known in the art. In essence, such databases cross reference geographical areas with white-space channels available for use within specific sub-regions of that geographical area (e.g. an area is divided into smaller regions or cells). For example, a geographical area (such as a country, country state, etc) may be dissected or sub-divided into a plurality of sub-regions or cells within the database. Each of these sub-regions may have a specific set of white-space channels that may be usable within that sub-region. This is illustrated in FIG. 1, whereby each sub-region (denoted by the boxed areas in the database grid) contains an indication whether channel/band 'A' and/or 'B' is available for use within each particular sub-region. Geographical areas and channels recorded by these databases are, at least in some current channel availability databases (such as those in the US), divided up so as to be denoted by rectangular (e.g. 50 m-by-50 m or 100 m-by-100 m) geographical sub-regions or grid points (as in this example the channel availability database is in the form of a grid, with each geographical sub-region being a regular shaped grid point or box). In the US at least, this is to be in conformity with current FCC rulings, but other regions may have different standards and implement their availability database(s) differently.

These databases operate on the principle that, if the geographic location of a particular white-space device is known, then the channels available for use by that white-space device can be identified by comparing the geographical location of the white-space device to the geographical area represented by the database. Where the geographic location of the white-space device matches up/overlaps with one or more geographical sub-regions, the channels available for use by that white-space device being in the particular determined geographical location are thereby determined. Secondly, according to the FCC ruling, all unlicensed white-space devices must access such a channel availability database to determine channels that they are allowed to operate on before they begin white-space transmission or operation. WSDs must therefore transmit and report their determined geographic location when querying with such databases.

For example, some white-space devices may determine their location via an onboard GPS system, or they may utilise local Wi-Fi networks to establish their position. Others may actually be geographically fixed and therefore they know their exact location anyway. Typically, the geographic location of the white-space device is encoded using Geography Markup Language (GML) which is a standard used to universally encode and transmit geographical location of such devices. There are many methods known in the art for determining the geographical location of such devices and, as such, will not be discussed at length here.

When a white-space device sends its location to the database via query signalling, the database can verify which channels are available for use within the area the white-space device has identified it is located in. The database should only inform the white-space device of channels that can be used without interference with other devices, primary users of such devices and protected entities (for example, entities/devices operating on frequencies/bandwidths that are already allocated to a particular use). This may sometimes entail informing a white-space device that no channels are available where necessary. This is to ensure that unlicensed use of allocated white-space frequencies does not interfere with already established frequency use in a particular area or locality.

The FCC also requires new unlicensed white-space devices to include spectrum-sensing technology allowing them to detect the presence of other signals in their vicinity. For example, to detect if there are other localised wireless transmission/reception sources in their vicinity that the white-space devices could interfere with if they operated on these frequencies. Such information is constantly in flux and unpredictable, and therefore is not typically logged in a channel availability database. Therefore the white-space devices must conduct their own localised survey of their location/area to verify white-space channels suitable for them to operate over. There are other conditions and stipulations set forth by the FCC ruling/standard for unlicensed white-space devices. These would be clearly understood by a skilled person based on the documents produced by the FCC on such matters.

Variations on the abovementioned white-space database type systems have been proposed as a solution to spectrum sharing.

See for example:
http://www.faqs.org/patents/app/20090034508; and
https://mentor.ieee.org/802.19/dcn/09/19-09-0049-00-tvws-geographic-electromagnetic-radiationdomain-control-system.pdf Within some projects, (for example, the EU FP7 project E3) some studies have attempted to address optimizing the use of radio communications of a mobile device/terminal by waiting for a wider capacity radio system to become available until the mobile terminal reaches the coverage area of such a system—[see section 3.3.1 in the E3 Deliverable D4.4 Final solution description for autonomous CR functionalities].

US 2009/180359 (Alcatel Lucent) describes a method of operating a cognitive radio device and also a cognitive radio device. This document is also related to databases with information on choosing radio parameters.

US 2009/088089 (Microsoft) describes communication methods that use control channel negotiated intermittent wireless communication using historical information.

JP 2005-236818 (SonyEricsson) describes wave environment information server that provides for radio wave environment notification for mobile devices/terminals.

The listing or discussion of a prior-published document or any background in this specification should not necessarily be taken as an acknowledgement that the document or background is part of the state of the art or is common general knowledge. One or more aspects/embodiments of the present disclosure may or may not address one or more of the background issues.

SUMMARY

In a first aspect, there is provided an apparatus configured to:
receive predicted geographic path signalling associated with prediction of a geographic path to be taken by a mobile device, the path extending across two or more (e.g. adjacent) cells, each cell defining a particular set of radio channels available for use by the mobile device in that cell;
determine one or more radio channels available for use by the mobile device along the path; and
provide, in advance, an indication of the one or more radio channels available for use by the mobile device along the geographic path in each respective cell along the path.

This allows the mobile device to be given advance information regarding which channels can be used in which respective cells along the path. This indication may be in advance of actual travel along predicted geographic path. The advance indication may be provided at the initial outset of a journey, or at some time into a journey e.g. whilst the device is still in the first cell of the predicted journey or before it has crossed into another (e.g. an adjacent) cell. The prediction may be updated at intervals (e.g. based on deviation from the current prediction or at regular predetermined time/distance travelled intervals) along the journey.

The apparatus may be located in the mobile device or fixed in the cell network (e.g. part of a network server/database), and/or distributed between the mobile device and the fixed cell network.

The plurality of cells may include each of the cells along the geographic path, or some of the cells that lie along a portion of the path (which may or may not be adjacent to one another). The cells may define or lie along subsections of the geographic path. The geographic path may be made up of a plurality of path segments, each lying wholly within a single cell.

The apparatus may be configured to:
determine one or more radio channels available for use by the mobile device that are common to a plurality of the cells that the path extends across; and
provide, in advance, an indication of the one or more common radio channels available for use by the mobile device along the geographic path in the plurality of cells along the path.

This allows the apparatus to identify, in advance, cells which share a common available channel/channels with each other for a given mobile device. Such cells may be adjacent to one another, or they may not necessarily be adjacent to each other, (for example, they may be separated by one or more further intermediate cells e.g. if there are no unlicensed/available/unauthorised channels in an adjacent cell).

The predicted geographic path signalling may provide an indication of one or more of: a motion vector of the mobile device, a probable route of the mobile device, a user defined geographic path to be taken, a pre-determined route of the mobile device, a pre-determined destination of the mobile device, and an initial location of the mobile device.

The predicted geographic path signalling may indicate a predicted geographic path that is at least a portion of a longer (e.g. predicted) journey. For example, a journey may represent a complete and simplified movement of a device along a particular route from an origin to a destination. A predicted geographic path may represent at least a portion of this journey, or even the route. For example, a predicted geographic path may cover some or all of a complete journey.

The predicted path may be and/or may represent the entire route/journey to be taken by the mobile device, or it may be a portion of a longer route/journey to be taken by the mobile device. This portion may be the beginning, middle, or end of a journey, or anywhere in between the beginning and end of a journey. One or more respective predicted paths may be provided to describe the entire route/journey to be taken. Some or all of these may be provided in advance. Some or all of these may be provided at points throughout the journey.

The apparatus may be configured to receive updated predicted geographic path signalling throughout the journey of a mobile device.

The apparatus may be configured to provide the indication of the one or more channels available for use in advance of the mobile device moving along the geographic path, or when the device is in a cell corresponding to an initial part of the path.

The apparatus may be configured to, for a locally defined network comprising a particular plurality of mobile devices, one of which is configured to act as a master node for the other mobile devices of the network:
  receive predicted geographic path signalling associated with the prediction of the geographic path to be taken by the master node mobile device of the locally defined network,
  determine one or more radio channels available for use by the master node mobile device of the network along the path; and
  provide, in advance, an indication of the one or more radio channels available for use by the master node mobile device of the network along the geographic path in each respective cell along the path, the indication for use by the master node mobile device to define the channels available for use by the other mobile devices of the network.

This allows a single ("master node") device to represent an entire locally defined network at the apparatus. This allows the apparatus to determine channel availability for one device, yet also determine and provide advance channel availability information for a plurality of devices in a network.

The apparatus may be configured to share the relevant available channel information with some or all of the devices in a network. For example, if the network is represented by a single master node mobile device to the apparatus, then the apparatus may be configured to provide the channel availability indication for the network to the master node device, which would then share the channel availability indication with the rest of the network.

Each cell may be representative of one or more of: cells of a cellular mobile telephone network, cells/geographical regions of a white-space device database, cells/geographical regions of a television broadcast network, or the like.

The apparatus may be configured for identification of available white-space channels for one or more mobile white-space devices, wherein the mobile device is a mobile white-space device, and wherein the cells define a particular set of white-space radio channels available for use by a mobile white-space device in respective cells.

The cells may define a particular set of unlicensed radio channels available for use by a mobile device in that cell.

The unlicensed radio channels may be defined as unlicensed or unauthorised for use by one or more of: a particular radio network (e.g. 2G, 2.5G, 3G, GSM, TDMA, WCDMA, CDMA, etc), a particular radio network operator, a particular device or radio network user, a particular mobile device owner, a particular user of a network of mobile devices, a TV broadcaster/transmitter/receiver.

In another aspect, there is provided an apparatus comprising:
  means for receiving predicted geographic path signalling associated with prediction of a geographic path to be taken by a mobile device, the path extending across two or more (e.g. adjacent) cells, each cell defining a particular set of radio channels available for use by the mobile device in that cell;
  means for determining one or more radio channels available for use by the mobile device along the path; and
  means for providing, in advance, an indication of the one or more radio channels available for use by the mobile device along the geographic path in each respective cell along the path.

In another aspect, there is provided a system comprising the apparatus of the first aspect and a mobile device, the apparatus/mobile device configured to:
  provide predicted geographic path signalling associated with prediction of a geographic path to be taken by the mobile device, the path extending across two or more (e.g. adjacent) cells, each cell defining a particular set of radio channels available for use by the mobile device in that cell; and
  receive an advance indication of one or more radio channels available for use by the mobile device along the geographic path in each respective cell along the path.

The mobile device may be configured to act as a master node, wherein the indication of available channels for use by the master node mobile device also defines the channels available for use by the other mobile devices of the network. As mentioned above, a single device of the plurality in the network acting as a master node can represent an entire locally defined network at the apparatus.

The mobile device (or devices) may be configured to make use of unlicensed radio channels, such as white-space channels (as defined by the FCC or other national licensing authorities), etc.

The apparatus may be configured to consider the number of changes in channel selection as the device is to travel (or travels) along the predicted path to minimise one or more: channel availability requests, channel switches between respective cells, power consumption by the mobile device, bandwidth use by the mobile device and/or the apparatus itself.

The apparatus may be configured to provide an advance indication of one or more channels available for use by the mobile device that corresponds to minimising one or more of: channel availability requests, and power consumption by the mobile device.

In another aspect, there is provided a method comprising:
  receiving predicted geographic path signalling associated with prediction of a geographic path to be taken by a mobile device, the path extending across two or more (e.g. adjacent) cells, each cell defining a particular set of radio channels available for use by the mobile device in that cell;
  determining one or more radio channels available for use by the mobile device along the path; and
  providing, in advance, an indication of the one or more radio channels available for use by the mobile device along the geographic path in each respective cell along the path.

The method may comprise, for a locally defined network comprising a particular plurality of mobile devices, one of which is configured to act as a master node for the other mobile devices of the network:
  providing predicted geographic path signalling associated with the prediction of the geographic path to be taken by the master node mobile device of the locally defined network,
  determining one or more radio channels available for use by the master node mobile device of the network along the path; and providing, in advance, an indication of the one or more radio channels available for use by the master node mobile device of the network along the geographic path in each respective cell along the path, the indication for use by the master node mobile device to define the channels available for use by the other mobile devices of the network.

In another aspect, there is provided a computer readable medium comprising computer code stored thereon, the computer code configured to, when run, perform a disclosed method.

Corresponding computer programs for implementing one or more of the methods disclosed are also within the present disclosure and encompassed by one or more of the described embodiments.

The present disclosure includes one or more corresponding aspects, embodiments or features in isolation or in various combinations whether or not specifically stated (including claimed) in that combination or in isolation. Corresponding means for performing one or more of the discussed functions are also within the present disclosure.

The above summary is intended to be merely exemplary and non-limiting.

BRIEF DESCRIPTION OF THE FIGURES

A description is now given, by way of example only, with reference to the accompanying drawings, in which:

FIG. 4a shows an illustration of the operation of the prior art;

FIG. 4b shows an illustration of a disclosed operation;

FIG. 5 shows a further disclosed embodiment;

FIG. 6 shows the operation of yet another disclosed embodiment;

FIG. 7 illustrates further the embodiment of FIG. 6;

DESCRIPTION OF EXAMPLE ASPECTS/EMBODIMENTS

According to a first embodiment, there is described herein an apparatus for providing an advance indication of channels available for use by a mobile device travelling along a geographic path. The path extends across two or more adjacent cells, with each cell defining a particular set of radio channels available for use by the mobile device in that cell. The apparatus is configured to receive predicted geographic path signalling associated with prediction of the geographic path to be taken by the mobile device. The apparatus is also configured to determine radio channels available for use by the mobile device along that path. The apparatus is also configured to provide, in advance, an indication of the radio channels available for use by the mobile device along the geographic path in each respective cell along the path. The discussed embodiments mainly relate to adjacent cells but it will be appreciated that other embodiments may not be limited to predictions based on adjacent cells (e.g. if there are no unlicensed/available/unauthorised channels in an adjacent cell).

Normally, as is known and performed in the prior art, channel availability requests would need to be made by the device upon entering different cells or regions. By providing an advance indication of available channels in the respective cells along the path, it is possible to reduce the number of channel availability requests that would otherwise be necessary as the mobile device moves between cells. With the provided advance indication of available channels, channel selection over a particular geographic path can be planned in advance. By providing for selection of appropriate radio channels for use by the mobile device in advance of movement from one cell to another (e.g. movement between adjacent cells), it is possible to minimize and even optimise the number and frequency of such requests.

Through reducing/minimizing the number of such requests, many advantages may be provided. For example, less requests being made may improve battery life of the mobile device, reduce demands on operating/processing power of the device, and may save time as channels may not need to be switched every time a new cell is entered. Similarly, demands placed on the apparatus due to high volumes of requests may be reduced, as well as reducing the bandwidth being used at any given point by the apparatus.

Figure 1:
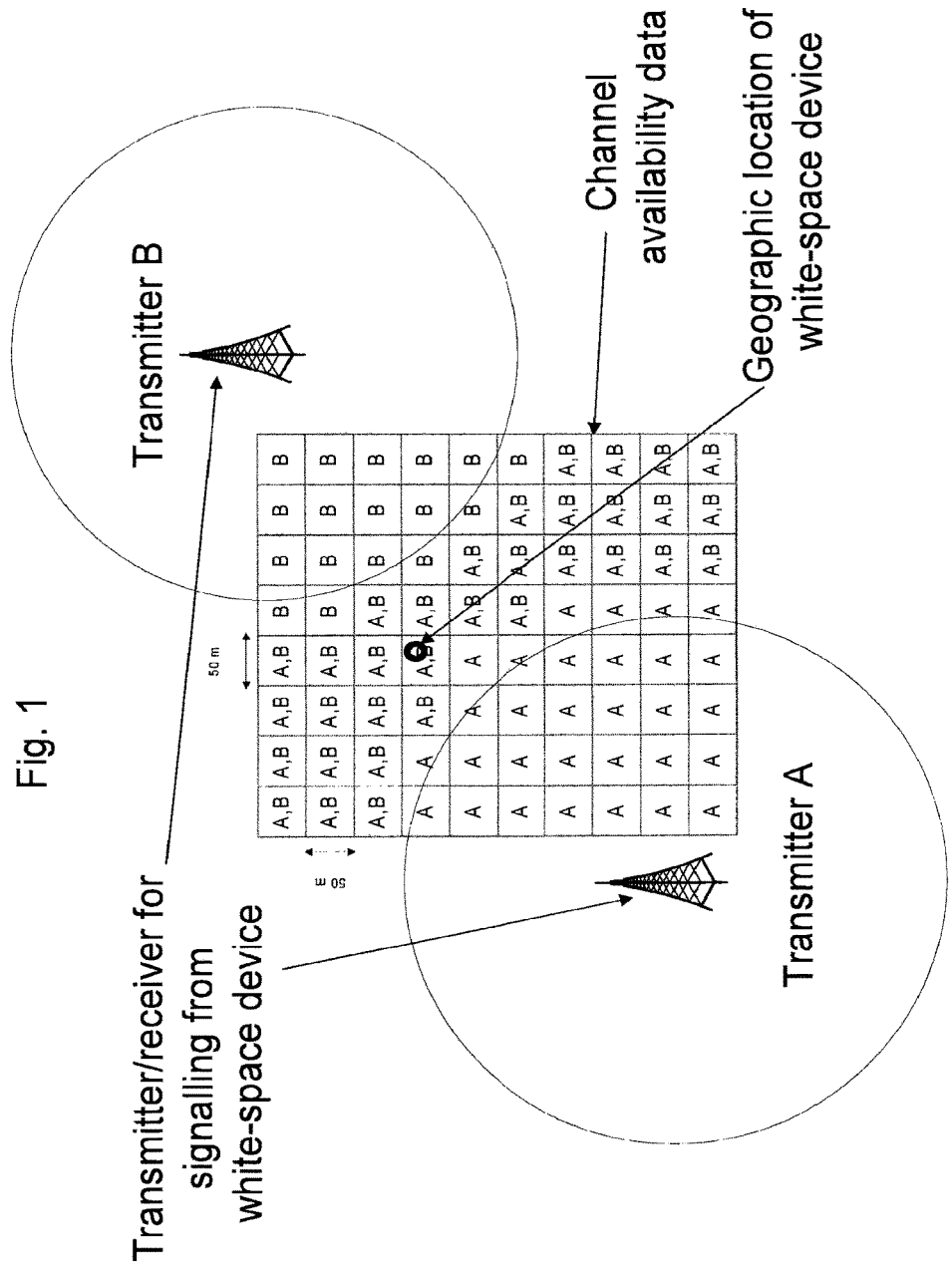
FIG. 1 shows an illustration of the operation of an example of the prior art.
Figure 2:
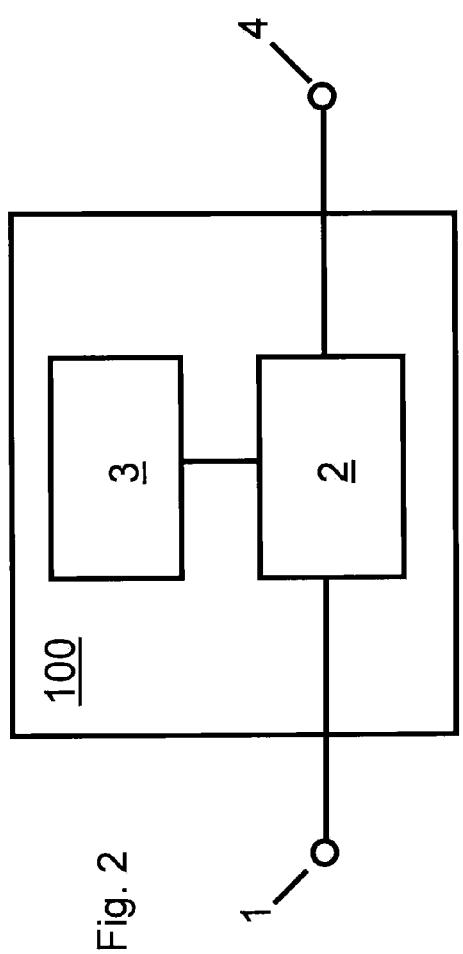
FIG. 2 shows an illustration of the apparatus according to a first disclosed embodiment.

We will now describe such an apparatus 100 according to a first embodiment of the present invention with reference to FIG. 2. It should be noted that in this embodiment the apparatus 100 is directed towards channel availability requests made by mobile white-space devices. However the apparatus 100 may equally be applied in other embodiments to other mobile devices that require determination of channel availability in a given geographical region or cell (cells of a mobile cellular (e.g. 2G, 2.5G, 3G, CDMA, WCDMA, TDMA, 4G) network or WLAN network).

FIG. 2 schematically illustrates apparatus 100, which comprises an input 1, a processor 2, a memory 3, and an output 4. This apparatus could be part of a mobile device or be located at a network server remote to the mobile device (or have elements distributed between the two ends of such systems).

The input 1 is a wireless receiver, at least in this embodiment, that is capable of receiving the incoming signalling associated with a mobile device. This wireless receiver can be a radio mast receiver or transceiver, or any other wireless receiver (such as an antenna or aerial) that is capable of receiving suitable electromagnetic radiation such as long and short radio waves, microwaves, or the like. In other embodiments, the input 1 is a physical electrical connection to a further receiver, or to a further system configured to receive and handle such (white-space) channel queries. A purpose of the input 1 is to receive signalling associated with white-space devices so as to provide this onward to the processor 2. The skilled person will appreciate that there are other options available that would be suitable for providing an appropriate input 1. For example, the communication interface between mobile white-space devices and a relevant channel availability database could be, in some embodiments, over a hypertext transfer protocol (HTTP) link over the Internet.

The processor 2 is an Application Specific Integrated Circuit (ASIC) specifically configured to perform the task of processing incoming signalling from the input 1. In other embodiments, the processor is a general purpose CPU that is capable of performing the same tasks, or capable of performing further tasks as well. In other embodiments the processor 2 comprises a plurality of separate integrated circuits that are provided to perform said tasks. These integrated circuits may be provided locally and together, or separately or even remote from one another.

The processor 2 has a first input pin to allow the processor 2 to be electrically connected to input 1, a second output pin to allow the processor 2 to be electrically connected to output 4, and a third memory pin to allow the processor 2 to be electrically connected to memory 3. This memory pin can be considered to be a memory interface of the processor to allow the processor 2 to access the memory 3. In other embodiments the respective pins may be part of a multi-bit bus arrangement for interfacing the processor 2 to the other described components.

The memory 3 is a computer readable medium that has a channel availability database stored thereon (such as those databases discussed previously). In this embodiment, the memory is readable/writeable solid state memory. In other embodiments, the memory may be read only memory (ROM), or may even be a physical hard drive.

The memory 3 is to be electrically connected to the processor 2 via the memory interface of the processor 2 to allow the processor 2 to access the channel availability data stored on the memory 3. The skilled person will appreciate that, as the memory is just providing the processor 2 with the data needed to determine channels available to particular white-space devices, there are other embodiments (not shown) in which the memory 3 providing the database may actually be distinct and separate from the apparatus 100, and may be just remotely accessed by the processor 2 of the apparatus.

In such embodiments, the memory may still be a solid state memory or hard drive, but the memory providing the database may also be in the form of an electrical signal such as an online stored database. The database may even be a collection of smaller databases that the processor is able to access via the memory interface. The skilled person will appreciate that other such variations are also within the scope of the disclosure.

The output 4 is a wireless transmitter for transmitting a response to a channel availability query, at least in this embodiment. In other embodiments it is a physical electrical connection to a further transmitter, or to a system that is set up to handle such channel availability queries (as mentioned briefly above). The output 4 is to be electrically connected to the processor 2 to allow for electrical communication between the two components. A purpose of the output 4 is to allow the processor 2 to communicate the channels it has determined as available onwards, e.g. to a transmitter and onto a white-space device, etc.

In another embodiment (not shown), the input and output 1, 4 are actually both part of the same transceiver that is configured to be able to receive signalling associated with white-space devices, and also to be able transmit a response to said signalling.

We will now describe the assembly/physical structure of this apparatus 100.

The input 1 is electrically connected to the input interface (not shown) of the processor 2, the output 4 is electrically connected to the output interface (not shown) of the processor 2, and the memory 3 is electrically connected to the memory interface (not shown) of the processor 2. This is to allow the processor 2 to be in electrical communication with each of these elements.

In this embodiment, the apparatus is formed on a printed circuit board (PCB, but this may also be a printed wiring board—PWB). The processor 2 and memory 3 are actually soldered directly to the PCB, and the respective electrical connections between the pins of the processor 2 and the input 1, output 4, and memory 3 are also formed via soldering. In a variation of this embodiment, a multi-bit bus is provided to electrically connect the processor 2 to the respective components 1, 3 & 4. In other embodiments the PCB provides a push-fit integrated circuit (IC) connector (not shown) for receiving the processor 2 and soldering lugs connected to this connector for allowing direct connection of the other components to the processor 2 (once push-fit into the IC connector). In other embodiments screw terminals may be used to connect the various components together.

In another embodiment, for example one where the memory 3 providing the database is actually separate from the apparatus 100, the processor 2 is actually formed within a module (for example, being formed within epoxy resin) and the pins of the processor 2 connected to external wire conductors that allow for connection to the other components (input 1, output 4 and memory 3).

The skilled person will appreciate that there are a number of other variations that may be used to assemble the described apparatus 100.

Before we describe the operation of the processor 2 and the apparatus 100, we will first set the context for this embodiment. We will now refer to FIG. 3 in order to help understanding of the terms that we use in describing this embodiment of the present disclosure.

As discussed above, white-space devices are (at least in the US) typically required to report their geographic location in order to receive information regarding unlicensed radio channels available for use by them in their particular geographical region or cell. It should be noted that 'unlicensed' radio channels primarily come under the term 'white-space', but it will also be appreciated that some radio channels can be defined as unlicensed or unauthorised for use by different parties other than white-space device users. For example, unlicensed radio channels may be unlicensed for use by a particular radio network (e.g. 2G, 2.5G, 3G, GSM, TDMA, WCDMA, CDMA, 4G, WLAN etc), a particular radio network operator (e.g. Vodafone™, Orange™), a particular device or radio network user, a particular mobile device owner, a particular user of a network of mobile devices, a TV broadcaster/transmitter/receiver, and the like. The skilled person will appreciate that this embodiment of the present disclosure and other embodiments described herein are also applicable to determining such unlicensed radio channels availability.

For a stationary device, a channel availability query will usually only happen once on start up to establish appropriate channels for use. However, (as we have briefly discussed above), for a mobile device that is actually on the move and is travelling across different regions with different channel availability, these channel availability requests need to be performed every time the device moves from one region/cell into another. This is to be in accordance with present FCC rulings/standards.

Figure 3:
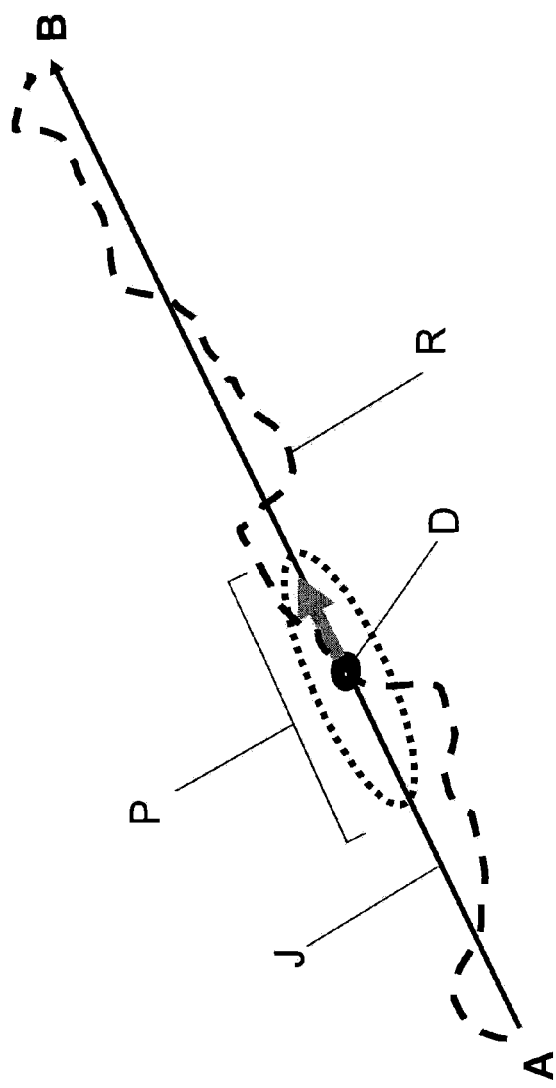
FIG. 3 shows an illustration of the different elements of a journey to be undertaken by a mobile device in the context of the first disclosed embodiment.

When mobile devices are moving, they inevitably have an origin from where they start moving, and a destination where they finish. In the illustration of FIG. 3, device D is moving between origin A, and destination B. For example, the mobile device may belong to a user who is going from their home at point A, to their workplace at point B. This may involve a specific 'route' R from A to B, i.e. taking specific roads, streets, motorways, trains, buses, or the like, to get from A to B. We will be referring to the specific pattern of movement traced out by the device's travels as the 'route' R.

Whilst a device D may take a very specific route R, this may be represented more simply and more succinctly than the very specific route R actually taken. For example, in FIG. 3 it can be seen that although the device is moving along a specific route R, the movement can be summed up as a direct 'journey' J from A to B, although in reality the actual journey may be more indirect. This direct 'journey' J is a simpler way of describing the overall journey/movement that has taken place. A journey J may be described as a direct line from origin A to origin B, but it may simply be a smoother representation of the more complex route R actually taken by the device. In any case, the journey J is intended to represent the total route R taken across a geographic area made up of individual cells/regions (as described above). The predicted geographic path is a prediction of at least a part of the route/journey to be taken by a mobile device.

In order for the apparatus 100 to provide an advance indication, it is necessary for it to receive signalling that indicates the predicted movement to be taken by a mobile device D. We refer to this as the predicted 'geographic path' P of the device, the accuracy of which will depend on a number of features including the technique used to make the calculation/prediction and the data available for use in the calculation/prediction.

For certain devices and/or journeys, it may be possible to predict the entire complete movement of the device from origin to destination (for example, where GPS navigation is used and the user has a destination (and the origin is known). In such cases, the predicted geographic path P may actually represent the entire journey J and/or the entire route R to be taken by the device D. This prediction may, of course, need to be updated during the journey to reflect the actual route taken (e.g. based on deviation from the earlier/previous prediction).

For other devices and/or journeys, it may not be possible to for a mobile white-space device to predict an entire journey J from start to end. For example, where GPS is not used/available, where no destination has been entered by the user, where only the present location at any given moment is known and being tracked, where no final destination is determined, etc. However, it will be appreciated by the skilled person that predictions can still be made for at least a portion of the journey J at any given time i.e. for the current route R. For example, a subsection of the total journey J may be predicted at each step of the journey J to provide a current predicted geographic path P for the apparatus 100 which more closely resembles the actual route taken. In the context of the disclosed embodiments, we have used this term to represent at least a portion of a longer journey J.

It will be appreciated by the skilled person that there are a variety of different ways to calculate a geographic path P to be taken by a mobile device. For example, GPS navigation may provide a clear way of identifying a complete journey to be taken by a device. In another example, where a final destination is not known, GPS may provide for tracking of the device along the (as yet) unknown journey. Other technologies that allow for tracking of movement of a mobile device could also be used (e.g. mobile triangulation, etc). By calculating a motion vector of the device (e.g. how fast the device is moving and in which direction), it is possible to artificially predict the next predicted position of the device at a later time, and thereby predict a geographic path to be taken by the device to get to that location. Another possibility is to use a determined motion vector to provide a predicted geographic path in the form of an ellipsoidal uncertainty area around the location of the device, with the longer axis in the direction of the motion vector. This would allow for error in the prediction of the geographic path to be taken. This ellipsoidal prediction of movement is illustrated in FIG. 3.

In any case, the skilled person will appreciate that there are many different ways to identify and predict a geographic path to be taken (e.g. using a probable/calculated route of the mobile device, a user defined geographic path to be taken, a pre-determined route of the mobile device, a pre-determined destination of the mobile device, and an initial location of the mobile device) or navigation technologies known in the art that can be used to pinpoint the location of a device, and whose information can be used to predict a geographic path to be taken by the mobile device over a period of time.

We will now describe the operation of an embodiment with reference to FIGS. 4a and 4b.

The FCC regulation for the US TV white spaces is primarily directed towards semi-portable devices (such as wireless access points at homes), which need to contact the database each time, when they have been moved more than 50 m. For devices that are totally mobile (such as mobile phones and laptops) this scheme is too rigid and presents several problems.

As illustrated in FIG. 4a (operation of the prior art), when a device D moves it goes on a journey from A to B. In the prior art, as this device passes through different regions/cells denoted by a channel availability database, it must make new channel availability queries once the device D enters each new region/cell. We have already discussed this above. This is to ensure that the channel the device D previously operated on within the last region/cell does not interfere with the channels that are available within the new region/cell that it has entered. This means that for every cell/region that the device D passes through along its journey, another channel availability request must be made to database DB in order to be in accordance with current FCC standards and rulings regarding avoidance of interference with pre-existing authorised local transmissions.

This is a cumbersome method for a number of reasons. For example, having to request channel availability every time the device moves into a new cell (i.e. every 50 m according to current FCC standards/rulings) uses up bandwidth, electrical power, operating power, and the like. This presents a drain on the resources of the mobile device. In order to conform to FCC rulings and standards, it would also be necessary to halt/stop the mobile device operating/transmitting on unlicensed communication channels until appropriate channels are verified as available for use. This would mean that every 50 m service/communication would be interrupted for a period of time until service could be resumed. This is undesirable for users and would place a burden on such users. In contrast, certain embodiments of the apparatus 100 operate in a manner that is directed to addressing one or more of these issues.

FIG. 4b shows an illustration of the operation of the first embodiment. As shown in FIG. 4b, the device D is also moving from origin A to destination B. As in the prior art, it is necessary to establish channels available for use by the mobile device D at the outset of the journey. However, in addition to this, the mobile device D is configured to predict the geographic path to be taken by the device D, i.e. to predict the movement from A to B, and to provide this as predicted geographic path signalling to the database DB, which in this scenario is apparatus 100.

Apparatus 100 receives this signalling from the mobile device D via input 1. The processor 2 then electrically receives this signalling from the input 1 and uses the signalling to determine channels available for use by the mobile device D across respective cells along the predicted geographic path (indicated by the geographic path signalling). In this embodiment, the processor 2 accesses the channel availability database stored on electrically connected memory 3, and maps the predicted geographic path across the database to establish channels available for use by the device within each respective cell/region.

In other embodiments, the processor 2 may not be directly associated with the memory 3 and may determine the predicted path to be taken by the mobile device D and provide this to an already existing white-space channel availability query server (with memory 3) to receive the advance channel availability data. In such embodiments the processor 2/apparatus 100 may act as a further stage in the processing performed by such channel availability query servers. The skilled person will appreciate that other variations are within the scope of the present invention.

Once the processor 2 has identified which cells of the database the device D is predicted to travel across, it can determine/identify the channels available for that device within each respective cell. Once the processor 2 has established the channels available for the device D within each respective cell/region that the device D is predicted to travel across (based on the predicted geographic path to be taken by the device D), the processor 2 provides an indication of the channel availability to output 4 which transmits this to the device D. In this embodiment, the advance indication is provided via return indication signalling using the wireless transmitter connected to output 4. In other embodiments this may be provided onwards to a transmission system or further white-space channel availability query server/system.

As a result of the operation of the apparatus 100, the mobile device is therefore provided with an advance indication of one or more channels that will be available for use within respective cells along the geographic path that the device D is predicted to travel along. These cells may or may not be adjacent to one another. This effectively allows the device/system to plan ahead as it moves along the geographic path and between cells. By planning ahead, the device D can select appropriate channels as it moves into different cells/regions, thereby reducing the need for repeated channel availability requests, and improving seamless connectivity on unlicensed communication channels whilst moving, e.g. there will be shorter interruption of connectivity on unlicensed channels whilst moving between cells, or even none at all as the device D already knows which channels to use upon entry into a different cell.

It will be appreciated that the predicted path (which may be determined by the apparatus or elsewhere) may be determined more than once along the journey/route e.g. if it is determined that the previous prediction is not being followed or there is likely to be a deviation.

We will now describe the further optimisation of advance channel indication/selection with reference to FIG. 5. As already illustrated in FIG. 4b, the apparatus allows for advance (e.g. while the device is still in one cell and before it has moved to the next (e.g. adjacent) cell in question along the predicted path) indications of channels available to the mobile device D whilst it is moving along a predicted geographic path. The embodiment in FIG. 5 shows how this can be further optimised to improve seamless connectivity for a device moving between cells along a geographic path or journey.

Again, device D is moving from origin A to destination B. The device D is predicted to cross over five different cells along this geographic path. In this scenario, the apparatus 100/processor 2 has identified/determined a full listing of channels available within each cell. For example, cell (i) has channels three and four available, whilst channels one, two, five and six are not available. In cell (ii), channels one, four and five are available, whilst channels two, three and six are not available, and so on. Once the apparatus 100 has determined the channels available in each cell, it can consider optimization of channel selection. In the present embodiment, the processor 2 is configured to consider available channels that are common to each of the respective cells along the predicted geographic path. As is illustrated in FIG. 5, it can be determined based on the predicted geographic path that channel four is common to all cells/regions that the path extends across. The processor 2 then provides this indication to the mobile device via output 4 that channel four can be used across all cells (i)-(v). Although in this embodiment the cells are adjacent to one another, in other embodiments, this may not necessarily be the case.

Normally within the prior art, it is of little consequence which channel is selected for unlicensed communication (where more than one channel is available within each cell and assuming all channels are equal, e.g. in strength, reliability, etc) as the channel availability is required to be repeatedly verified upon the device moving between cells. In essence, channel selection for a device within a given cell in the prior art is somewhat arbitrary. In certain embodiments of the present disclosure, one or more of channel strength, reliability etc. may also be considered as a criterion for determining channel availability (e.g. if more than one channel is available).

In contrast, there is a great benefit in the present embodiment of FIG. 5 in selecting a channel that is common across multiple cells/regions. By providing an advance indication of common channels available for use across some or all of the cells/regions along a predicted geographic path it is possible to reduce the number of channel switches that would take place as the device D moves from region to region, or even to eliminate the need for channel switching depending on the predicted path to be taken and channels available along that predicted path. As shown in FIG. 5, if channel four is selected at the start of the journey, no further channel changes need occur between the origin and destination if the predicted path is followed. This optimization of channel selection helps to reduce interruption of white-space communication, reduce power needed to switch channels, etc.

It should be noted that it may not always be possible to provide a single common channel indication to a device D. In some cases, it may be that subsections have a common channel, and that different subsections have different common channels.

This will still require some channel changes along the journey but will still provide for reduction of channel changes (as in the prior art) and reduce the number of channel availability queries and interruptions to channel communication inherent in the art. Furthermore, in certain embodiments, updating of prediction of the geographic path while the device is on its journey will mean that different channels are available for use.

We will now describe a further embodiment using networks with reference to FIGS. 6 & 7.

As we have already discussed above, a user may be carrying mobile device D on a route that may involve travelling along certain roads, streets, or taking trains, cars, buses, planes, etc. In some situations, there may be multiple other users who are also taking the same route (e.g. commuters on a train, bus; friends in a car, etc). In this respect, the multiple users are sharing a journey. In such situations, the users may form a locally defined network, such as ad hoc network, or a mesh network. Users may join or leave the network at any time, however it is helpful that they are all sharing at least a portion of a journey together.

FIGS. 6 & 7 illustrate an advantageous embodiment which provides for improvements of users of mobile devices D & D' in a locally defined network, where the devices D & D' wish to use unlicensed communication channels as per the above embodiments.

As discussed above, the present FCC regulation for whitespace devices requires channel availability queries to be made every time the device moves between cells, i.e. every 50 m. In the situation where a plurality of devices connect to each other in ad-hoc manner to form a mesh network, the whole network is moving together with its users (e.g. on a train, bus, plane, etc). In such a situation, the devices may lose their connection to the network every 50 m whilst their respective devices perform the required channel availability request. Planning communication and channel switching/changing during movement (as discussed above in the other embodiments) would provide for greater efficiency if the devices D & D' could be provided with information on channel availability in different locations beforehand.

As the multiple/plurality of devices D of the network shown in FIG. 6 are travelling together, i.e. they all pass through the same cells/regions along that path at substantially the same time, it can be said that they are all sharing the same journey. Therefore, the same channels available for one device of the network would also be available for all the other devices of the network (subject to capacity issues). The embodiment of FIGS. 6 & 7 operates on this principle, i.e. devices known to be sharing a common journey may therefore utilise at least some of the same channels for communication.

FIG. 6 illustrates essentially the same scenario as in FIG. 5, except that in FIG. 6 a number of other devices D are on the same journey as the single device in the scenario of FIG. 5.

The highlighted device D' is, in this locally defined ad hoc network, configured to act as a master node. This master node device D' effectively represents the network to the apparatus 100 (and in other embodiments may comprise the apparatus 100). The master node mobile device D' provides predicted geographic path signalling to the apparatus 100, which then operates in substantially the same way as for the single mobile device of FIG. 5. The processor 2 then returns the advance indication (via output 4) that channel 4 is available for use by master node mobile device D'. This advance indication may then be used by the other devices of the network to select appropriate channels available for use along the predicted geographic path to be taken.

FIG. 7 illustrates how the designated master node mobile device D' may provide this advance indication information to the other devices of the network.

In essence, a single device D' can represent an entire locally defined network to an apparatus such as apparatus 100. This helps to reduce the number of channel availability queries that would otherwise have to be made by each device of the locally defined network. This also helps to provide for similar advantages as already discussed above.

In summary, the abovedescribed embodiments collectively provide for several distinct advantages:

1) Provision of an advance indication—By determining and providing channel availability information for mobile devices based on their predicted geographic paths, instead of rigidly making channel availability requests every time a device moves into a new cell, it is possible to try to limit the number of queries being made by respective devices. It is also possible to have necessary channel availability in advance of the device moving to a new location (new (e.g. adjacent) cell). This advantage can be seen to applicable to many situations or fields where decisions and selections need to be made over the course of a journey based on a given predicted geographic path/location (as per FIG. 4*b*).

2) Optimizing channel selection—Once the advance channel information/indication is determined (or received), it is possible to select/plan in advance the channels that will be used in particular regions. Therefore, it is logical to select the communication frequency so that the number of channel/frequency changes that would occur over the course of a journey would be minimized. Again, this advantage could be applicable to many other situations or fields as per the first advantage.

3) Master node mobile device representing a network—As discussed, a single device of a network can represent a whole ad hoc/mesh network based on the principle that devices in a locally defined network can be assumed to share a journey across respective cells. Therefore, once channels are determined for one particular device of a network (e.g. a selected master node device), then the channel availability information for the other devices is also determined and may be shared out by the master node mobile device. This could be performed specifically for all locations of the mesh network nodes, or request could contain an uncertainty network radius around the master node (i.e. all devices would be located within this uncertainty area—see for example, document PCT/EP2009/007510). This embodiment could be applied to any group of devices where one or some of the devices could request information on behalf of the other devices of the group or network.

4) Sharing prediction of future movement—This advantage has not been discussed, but shall be mentioned briefly here. When a number of devices have requested channel availability information within a given geographical area (e.g. Central Park), or for a given route (e.g. a particular train journey), it is possible to build up a database of channel availability information according to those locations or journeys. For example, after a first device has moved from origin A to destination B, channel availability information for that route has been determined. Therefore, if this information was stored, then any device moving from A to B in the future could recall/use some or all of the same information/indication that was provided to the first device undertaking that journey. This information sharing could be stored and recalled using a secondary database, or (for common/useful information) could be preloaded onto devices or downloadable onto devices (e.g. like a subscription or update). Further optimization could also include pre-emptively altering the shared database to help avoid the situation where many devices are all trying to simultaneously operate on the same channels based on the shared information in the secondary database, thereby helping to optimize and streamline such usage.

Figure 8:
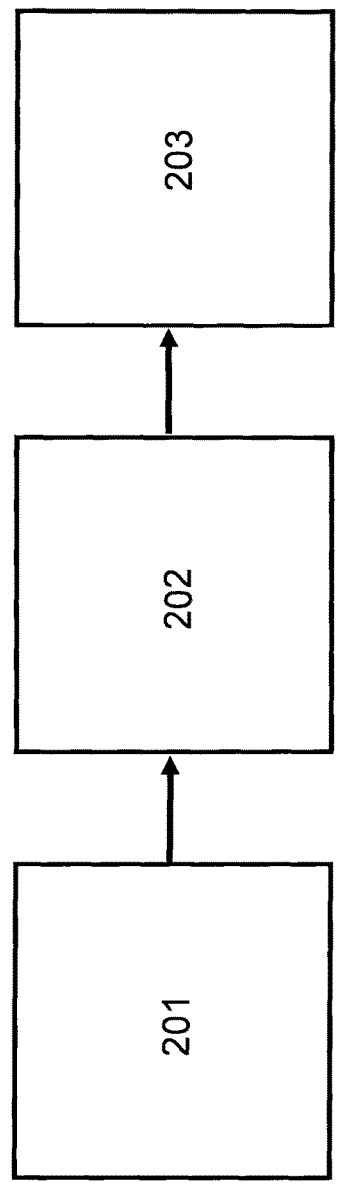
FIG. 8 shows a method of operation according to a disclosed embodiment.

We will now describe, with reference to FIG. 8, a method of operation. The method comprises:

201 receiving predicted geographic path signalling associated with prediction of a geographic path to be taken by a mobile device, the path extending across two or more (e.g. adjacent) cells, each cell defining a particular set of radio channels available for use by the mobile device in that cell;

202 determining one or more radio channels available for use by the mobile device along the path; and

203 providing, in advance, an indication of the one or more radio channels available for use by the mobile device along the geographic path in each respective cell along the path.

We have already described the details of these method steps in relation to the above embodiments. We therefore will not discuss this in further detail.

In a further variation/modification of this embodiment, the method is adapted for a locally defined network comprising a particular plurality of mobile devices, where one is configured to act as a master node for the other mobile devices of the network (as per the embodiment shown in FIGS. 6 & 7). This variation involves:

providing predicted geographic path signalling associated with the prediction of the geographic path to be taken by the master node mobile device of the locally defined network, determining one or more radio channels available for use by the master node mobile device of the network along the path; and providing, in advance, an indication of the one or more radio channels available for use by the master node mobile device of the network along the geographic path in each respective cell along the path, the indication for use by the master node mobile device to define the channels available for use by the other mobile devices of the network.

Figure 9:
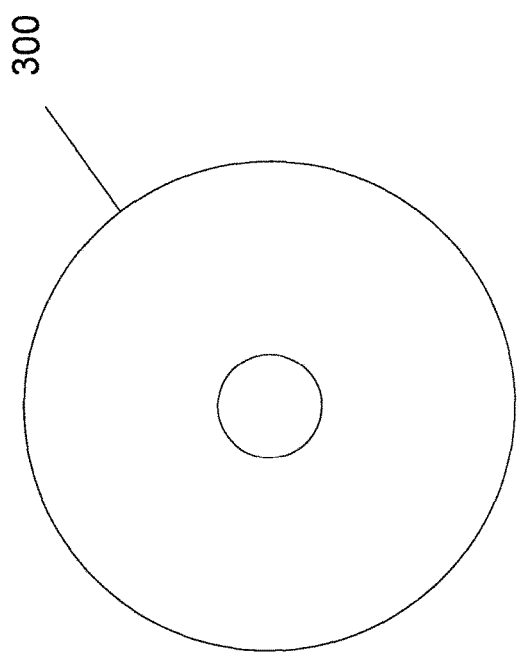
FIG. 9 shows a schematic illustration of a computer readable media providing a program according to a disclosed embodiment.

FIG. 9 illustrates schematically a computer/processor readable media 500 providing a program according to an embodiment of the present invention. In this example, the computer/processor readable media is a disc such as a digital versatile disc (DVD) or a compact disc (CD). In other embodiments, the computer readable media may be any media that has been programmed in such a way as to carry out an inventive function.

It will be appreciated to the skilled reader that any mentioned apparatus/device/server and/or other features of particular mentioned apparatus/device/server may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

In some embodiments, a particular mentioned apparatus/device/server may be pre-programmed with the appropriate software to carry out desired operations, and wherein the appropriate software can be enabled for use by a user downloading a "key", for example, to unlock/enable the software and its associated functionality. Advantages associated with such embodiments can include a reduced requirement to download data when further functionality is required for a device, and this can be useful in examples where a device is perceived to have sufficient capacity to store such pre-programmed software for functionality that may not be enabled by a user.

It will be appreciated that the any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

It will be appreciated that any "processor" described herein can comprise a collection of one or more individual processors/processing elements that may or may not be located on the same circuit board, or the same region/position of a circuit board or even the same device. In some embodiments one or more of any mentioned processors may be distributed over a plurality of devices. The same or different processor/processing elements may perform one or more functions described herein.

It will be appreciated that the term "signalling" may refer to one or more signals transmitted as a series of transmitted and/or received signals. The series of signals may comprise one, two, three, four or even more individual signal components or distinct signals to make up said signalling. Some or all of these individual signals may be transmitted/received simultaneously, in sequence, and/or such that they temporally overlap one another.

With reference to any discussion of any mentioned computer and/or processor and memory (e.g. including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/embodiments may consist of any such individual feature or combination of features. In view of the foregoing description it will be evident to a person skilled in the art that various modifications may be made within the scope of the disclosure.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. An apparatus comprising:
one or more processors; and
memory storing computer code configured to, with the one or more processors, cause the apparatus to at least:
receive, from a mobile device in a current cell, signalling identifying a geographic path, predicted to be taken by the mobile device, that extends across two or more cells of a network, wherein each of the two or more cells is different from the current cell, and wherein at least one of the two or more cells is non-adjacent to the current cell;
determine a listing of white-space channels indicating which are available for use in each cell along the geographic path, including a first indication of which are available for use in a first of the two or more cells and a second indication of which are available for use in a second of the two or more cells, wherein the cells are cells/geographical regions of a white-space device database;
determine, from the listing of white-space channels, which available white-space channel is indicated as being available for use in at least two cells along the geographic path by at least determining, from the first indication, that the available white-space channel is indicated as being available in the first of the two or more cells and determining, from the second indication, that the available white-space channel is indicated as being available in the second of the two or more cells; and
provide an indication of the available white-space channel to the mobile device.

2. The apparatus according to claim 1, wherein the signalling identifies the geographic path by including one or more of the following: a motion vector of the mobile device, a probable route of the mobile device, a user defined geographic path to be taken, a pre-determined route of the mobile device, or a pre-determined destination of the mobile device and an initial location of the mobile device.

3. The apparatus according to claim 1, wherein the geographic path represents at least a portion of a longer journey currently being taken by the mobile device.

4. The apparatus according to claim 1, wherein causing the apparatus to provide the indication of the available white-space channel includes causing the apparatus to provide the indication of the available white-space channel in advance of the mobile device moving along the geographic path.

5. The apparatus according to claim 1, wherein the mobile device operates in a locally defined network comprising a plurality of mobile devices, wherein the mobile device acts as a master node for the plurality of mobile devices and wherein causing the apparatus to provide the indication of the available white-space channel includes causing the apparatus to transmit, in advance of the mobile device entering any of the two or more cells, the indication of the available white-space channel to the mobile device so that the mobile device, when acting as the master node, is able to provide channel availability information to the plurality of mobile devices.

6. The apparatus according to claim 5, wherein causing the apparatus to determine the listing of white-space channels indicating which are available for use in each cell along the geographic path includes causing the apparatus to select only one or more white-space channels that minimize one or more of the following: channel availability requests, channel switches between respective cells, power consumption by the mobile device, bandwidth use by the mobile device or bandwidth use by the apparatus.

7. The apparatus according to claim 6, wherein each of the two or more cells is representative of one or more of: a cell of a cellular mobile telephone network, or a cell or geographical region of a television broadcast network.

8. The apparatus according to claim 6, wherein the mobile device is a mobile white-space device, wherein each white-space channel of the listing of white-space channels is an available white space radio channel for use by the mobile white-space device, and wherein a particular set of white-space radio channels available for use is defined for each of the two or more cells.

9. The apparatus according to claim 1, wherein the computer code is configured to, with the one or more processors, cause the apparatus to at least:
consider a number of changes in channel selection along the geographic path to minimize one or more of the following: channel availability requests or power consumption by the mobile device.

10. The apparatus according to claim 1, wherein each of the two or more cells are non-overlapping with each other.

11. The apparatus according to claim 1, wherein a particular set of unlicensed radio channels available for use is defined for each of the two or more cells and wherein causing the apparatus to determine the listing of white-space channels includes causing the apparatus to select from the particular set of unlicensed radio channels available for use that is defined for each of the two or more cells.

12. The apparatus according to claim 11, wherein an unlicensed radio channel is defined as unlicensed or unauthorized for use by one or more of the following: a particular radio network, a particular radio network operator, a particular device, a particular radio network user, a particular mobile device owner, a particular user of a network of mobile devices, a television broadcaster, a television transmitter, or a television receiver.

13. The apparatus according to claim 1, wherein the apparatus is a mobile apparatus or a network server apparatus.

14. The apparatus according to claim 1, wherein causing the apparatus to provide the indication of the available white-space channel to the mobile device includes causing the apparatus to provide the indication of the available white-space channel to the mobile device in advance of the mobile device moving to another cell along the geographic path.

15. A method comprising:
receiving, from a mobile device in a current cell, signalling identifying a geographic path, predicted to be taken by the mobile device, that extends across two or more cells of a network, wherein each of the two or more cells is different from the current cell, and wherein at least one of the two or more cells is non-adjacent to the current cell;

determining a listing of white-space channels indicating which are available for use in each cell along the geographic path, including a first indication of which are available for use in a first of the two or more cells and a second indication of which are available for use in a second of the two or more cells;

determining, by a computing device, from the listing of white-space channels, which available white-space channel is indicated as being available for use in at least two cells along the geographic path by at least determining, from the first indication, that the available white-space channel is indicated as being available in the first of the two or more cells and determining, from the second indication, that the available white-space channel is indicated as being available in the second of the two or more cells; and providing an indication of the available white-space channel to the mobile device, wherein the cells are cells/geographic regions of a white-space device database.

16. The method according to claim 15, wherein the mobile device operates in a locally defined network comprising a plurality of mobile devices, wherein the mobile device acts as a master node for the plurality of mobile devices; and wherein providing the indication of the available white-space channel includes transmitting, in advance of the mobile device entering any of the two or more cells, the indication of the available white-space channel to the mobile device so that the mobile device, when acting as the master node, is able to provide channel availability information to the plurality of mobile devices.

17. A non-transitory computer readable medium storing computer code configured to, when executed, cause an apparatus to at least:

receive, from a mobile device in a current cell, signalling identifying a geographic path, predicted to be taken by the mobile device, that extends across two or more cells of a network, wherein each of the two or more cells is different from the current cell, and wherein at least one of the two or more cells is non-adjacent to the current cell;

determine a listing of white-space channels indicating which are available for use in each cell along the geographic path, including a first indication of which are available for use in a first of the two or more cells and a second indication of which are available for use in a second of the two or more cells, wherein the cells are cells/geographical regions of a white-space device database;

determine, from the listing of white-space channels, which available white-space channel is indicated as being available for use in at least two cells along the geographic path by at least determining, from the first indication, that the available white-space channel is indicated as being available in the first of the two or more cells and determining, from the second indication, that the available white-space channel is indicated as being available in the second of the two or more cells; and provide an indication of the available white-space channel to the mobile device.

18. An apparatus comprising:

one or more processors; and memory storing computer code configured to, with the one or more processors, cause the apparatus to at least:

transmit, from the apparatus and via a network while the apparatus is in a current cell, signalling identifying a geographic path, predicted to be taken by the apparatus, that extends across two or more cells of the network, wherein each of the two or more cells is different from the current cell, and wherein at least one of the two or more cells is non-adjacent to the current cell; and receive, responsive to transmitting the signalling and via the network, an indication of an available white-space channel that is available for use by at least the apparatus within each cell along the geographic path, wherein the cells are cells/geographical regions of a white-space device database.

19. A method comprising:

transmitting, from a mobile device via a network while the mobile device is in a current cell, signalling identifying a geographic path, predicted to be taken by the mobile device, that extends across two or more cells of the network, wherein each of the two or more cells is different from the current cell, and wherein at least one of the two or more cells is non-adjacent to the current cell; and receiving, responsive to transmitting the signaling and via the network, an indication of an available white-space channel that is available for use by at least the mobile device within at least a first of the two or more cells and a second of the two or more cells, wherein the cells are cells/geographical regions of a white-space device database.

* * * * *